Aug. 29, 1944. C. E. NEWKIRK 2,356,876

DISK HARROW

Filed Aug. 5, 1942 3 Sheets-Sheet 1

Inventor
CLARENCE E. NEWKIRK

By Lacey & Lacey,
Attorneys

Aug. 29, 1944.    C. E. NEWKIRK    2,356,876
DISK HARROW
Filed Aug. 5, 1942    3 Sheets-Sheet 2
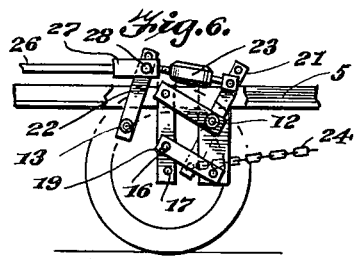
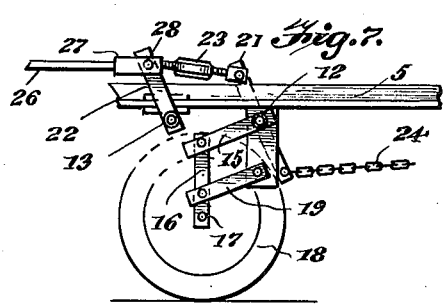
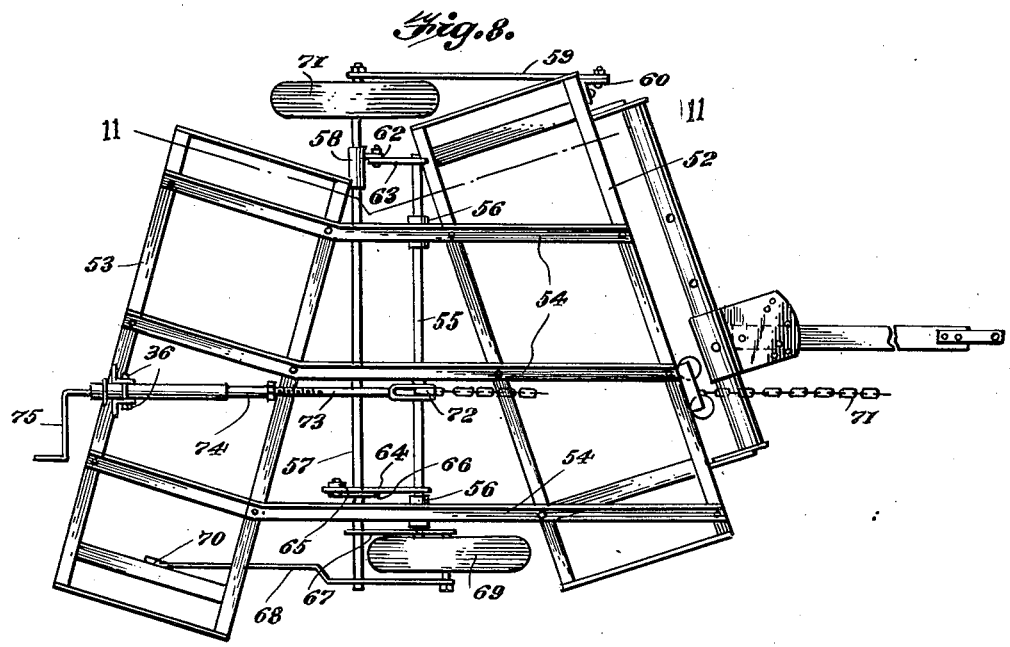
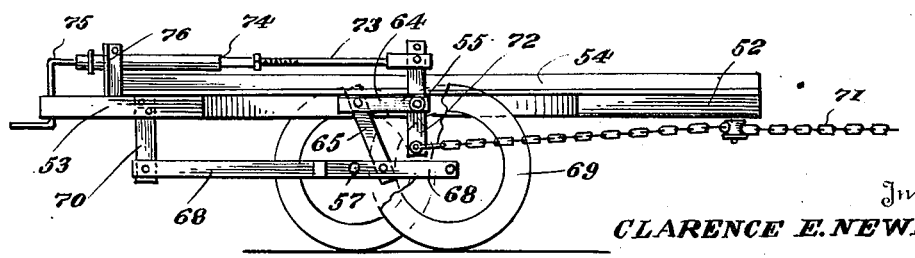
Inventor
CLARENCE E. NEWKIRK
By Lacey & Lacey,
Attorneys Aug. 29, 1944.　　　C. E. NEWKIRK　　　2,356,876
DISK HARROW
Filed Aug. 5, 1942　　　3 Sheets-Sheet 3

Inventor
CLARENCE E. NEWKIRK

By Lacey & Lacey
Attorneys

Patented Aug. 29, 1944

2,356,876

UNITED STATES PATENT OFFICE 2,356,876

DISK HARROW

Clarence E. Newkirk, Orange, Calif.

Application August 5, 1942, Serial No. 453,736

10 Claims. (Cl. 55—73)

This invention relates to agricultural machines and more particularly to a disk harrow, it being one object of the invention to provide a machine of this character wherein disks are carried by front and rear mounting frames disposed diagonally of a main frame, the front frame carrying a hitch bar so mounted that it may be shifted transversely of the main frame and an adjustable offset drag effect obtained.

Another object of the invention is to provide an agricultural machine of this character wherein the frames carrying the disks extend diagonally of the main frame in converging relation to each other transversely of the main frame and the hitch bar is carried by a mounting member shiftable along a draw bar carried by the forward disk-carrying frame and extending in parallel relation thereto transversely of the main frame.

Another object of the invention is to provide the main frame with a rear portion extending diagonally of the machine toward one side thereof so that the rear disk-carrying frame may be firmly mounted and held in its proper angular relation to the main frame and the forward diagonally extending disk-carrying frame.

Another object of the invention is to so mount the rear disk-carrying frame that it may be shifted transversely of the main frame to adjusted positions.

Another object of the invention is to provide the machine with axles carrying supporting wheels at opposite sides of the machine, the axles being so mounted that the wheels may be shifted vertically into and out of engagement with the ground.

Another object of the invention is to provide adjusting means for the wheels so formed and mounted that the wheels at opposite sides of the machine will be simultaneously shifted vertically, the wheels, when resting on the ground, being disposed one in advance of the other.

Another object of the invention is to so construct the wheel adjusting mechanism that while both move straight up and down when shifted vertically, one moves at a higher rate of speed than the other during such adjustment.

Another object of the invention is to provide an agricultural machine of the disk harrow type which is simple in construction and very strong and durable.

In the accompanying drawings:

Fig. 6 is a fragmentary view showing the adjusting and mounting means for the wheels in side elevation, the wheels being raised.

Fig. 7 is a view similar to Fig. 6, showing the wheels in lowered position.

Fig. 8 is a top plan view of a modified form of disk harrow, the disks being omitted.

Fig. 9 is a side elevation looking at the right side of the modified form of harrow.

Figure 1:
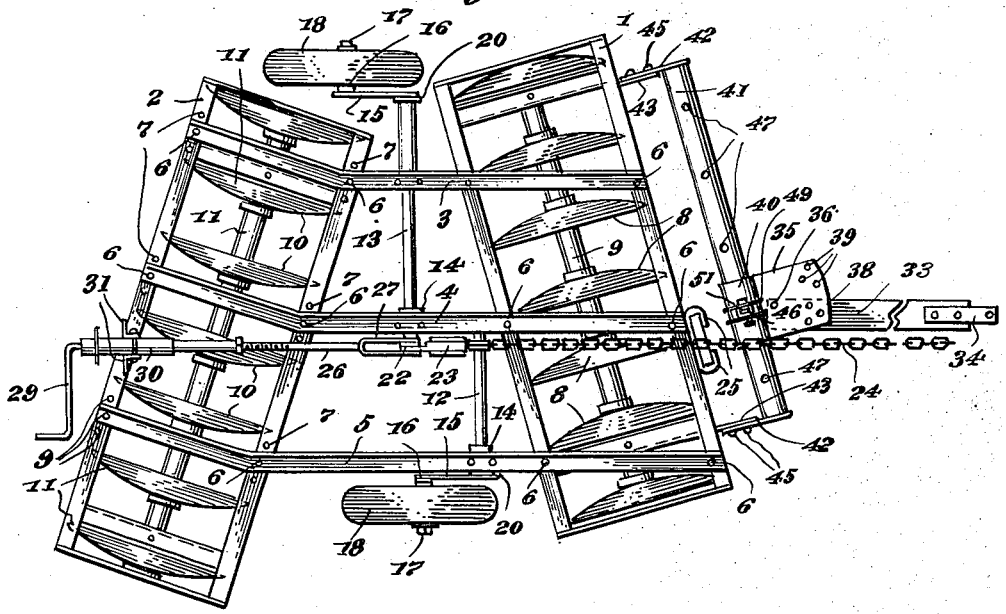
Fig. 1 is a top plan view of a disk harrow of the improved construction.
Figure 2:
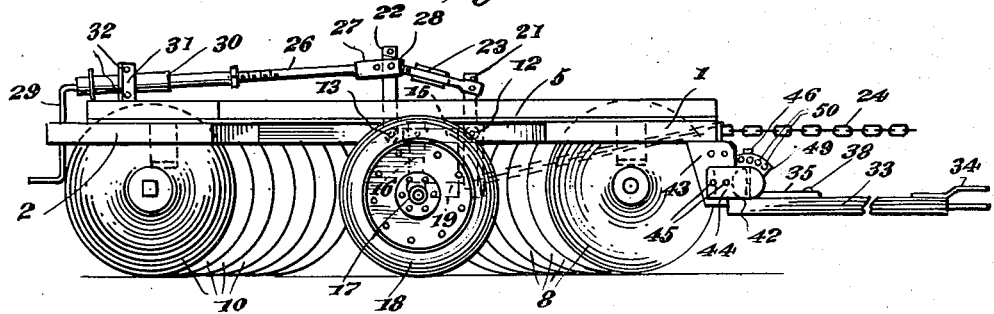
Fig. 2 is a side elevation of the improved disk harrow.
Figure 3:
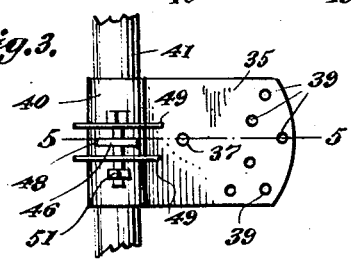
Fig. 3 is a fragmentary top plan view showing the mounting for the hitch bar on an enlarged scale.
Figure 5:
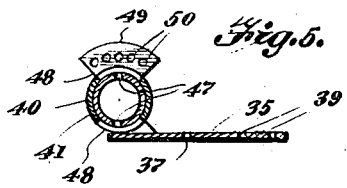
Fig. 5 is a section view on the line 5—5 of Fig. 3.
Figure 4:
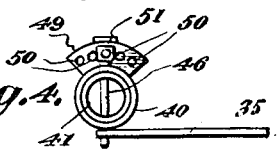
Fig. 4 is a view looking from one side of Fig. 3.
Figure 10:
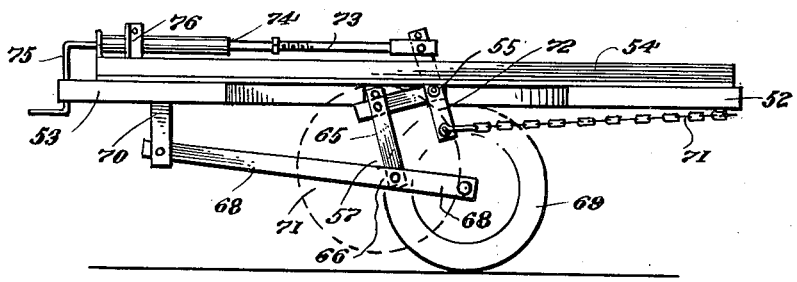
Fig. 10 is a view similar to Fig. 9, showing the wheel mounting means in an adjusted position.
Figure 11:
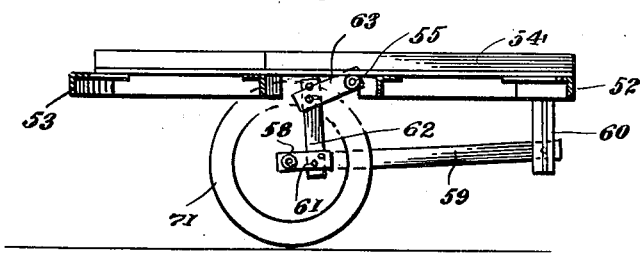
Fig. 11 is a sectional view on the line 11—11 of Fig. 8.
Figure 12:
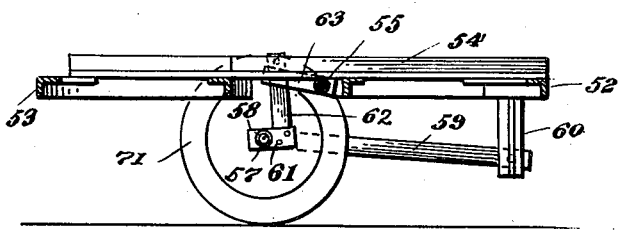
Fig. 12 is a view similar to Fig. 11, showing the wheel mounting means in adjusted position and the frame lowered.

This improved harrow has a body including a front frame 1 and a rear frame 2 formed of angle metal bars or strips which may be secured to each other by welding or in any other desired manner. These frames extend transversely of the body and have secured thereto bars 3, 4 and 5, which extend longitudinally of the machine and have their rear portions bent to extend diagonally toward the left side of the machine. Bolts 6 are preferably used as fasteners to secure the longitudinal bars to the front and rear frames and it is to be noted that the side bars of the rear frame are formed with fastener-receiving openings 7 arranged in groups, as shown in Fig. 1, so that passing the fasteners through selected ones of the openings may control the angle at which the rear frame extends. The two frames extend in converging relation to each other toward the left side of the machine and, therefore, the disks 8 carried by the shaft 9 of the front frame and the corresponding disks 10 carried by the shaft 11 of the rear frame will be disposed diagonally of the machine and also the front disks will extend diagonally of the rear disks.

The front and rear frames are spaced from each other to provide space under the main frame or body of the machine, between the front and rear disks and through this space extend axles 12 and 13 which are rotatably mounted through bearing sleeves 14 carried by the longitudinally extending bars of the main frame. Arms 15 extend rearwardly from outer ends of the axles 12 and 13 and are pivoted to upper ends of bars 16 which are disposed vertically and at their lower ends carry stub axles 17 for rotatably mounting the wheels 18. The vertically disposed bars or strips 16 are also pivoted to rear ends of bars 19 having their front ends pivoted to brackets 20 formed of metal plates and having their upper ends secured to the bearing sleeves 14 through which outer ends of the axles pass. By this arrangement, the bars 16 will be maintained vertically in parallel relation to the brackets 20 and also parallel to each other and, when the axles 12 and 13 are turned to swing the bars 16 vertically, the two wheels will be shifted into or out of position to rest on the ground and support the machine, according to the direction in which the axles are turned.

Lever arms 21 and 22 are rigidly carried by inner ends of the axles 12 and 13 and have their upper ends joined by a pivoted link 23 of turnbuckle construction so that this link may be adjusted to hold the lever arms 21 and 22 parallel to each other. Since the levers are connected by the link 23, they will be simultaneously moved and the two wheels shifted vertically to adjusted positions at the same time. The lever 21 is mounted midway its length upon the axle 12 with a portion extending downwardly from this axle and to its lower end is secured the rear end of a chain 24 which extends forwardly of the machine, between guide rollers or pulleys 25 and is of sufficient length to have its front end connected with a hydraulic lift of a tractor by means of which the harrow is drawn across a field. The chain may also be connected with a kick bar of standard construction for moving the lever 21 and lowering the wheels into engagement with the ground for supporting the machine while making a turn during operation of the harrow. Since the lever 22 extends upwardly a greater distance than the lever 21, the right wheel 18 is shifted upwardly more rapidly than the left wheel and the disks are held level at all times.

There has also been provided manually operated means for moving the levers and shifting the wheels vertically. The threaded rod 26 of this manually operated adjusting means extends longitudinally of the harrow and has forks 27 at its front end which straddle the upper end of the lever and are pivotally secured thereto by the fastener 28 which also secures the rear end of the turnbuckle link 23 to this lever. When the rod 26 is turned by its crank handle 29, it is shifted longitudinally through the companion internally threaded tube or sleeve 30 and the lever 22 will be tilted to turn the axles 12 and 13 and effect vertical shifting of the wheels. The sleeve or tube 30 is slidably mounted between brackets 31 carried by the rear side bar of the rear frame 2, where it is held against displacement by pins 32 and it will thus be seen that the manually operated adjusting means for the wheels does not interfere with operation by the hydraulic lift. By operating the manually controlled adjusting means for the wheels, the extent to which the disks will be lifted and moved out of engagement with the ground by the hydraulic lift may be controlled.

The harrow is to be drawn forwardly across a field or along a road by a tractor and, in order to do so, there has been provided a draft beam 33 having an attaching clevis 34 at its front end. This draft beam has its rear end connected with a plate 35 by a bolt or equivalent fastener 36 which passes through the beam and through an opening 37 formed in the plate and constitutes a pivot pin about which the draft beam may be swung to dispose it parallel to the longitudinal center of the harrow. After the draft beam has been swung to a desired position of adjustment, it is secured by a pin 38 passed through the draft beam and through a selected one of the openings 39 formed in the forward end portion of the plate. A sleeve 40 is rigidly mounted across the rear end of the plate 35 and loosely fits about a bar 41 which is preferably formed from a pipe of suitable length and diameter. This tubular bar extends transversely of the front disk-carrying frame 1 and has its ends closed by plates 42 which project rearwardly from the bar and are secured to brackets 43 carried by the front side bar of frame 1. The brackets 43 extend downwardly from frame 1 and are formed with sets of openings 44 spaced from each other vertically of the brackets so that by passing bolts 45 through a selected set of openings 44, the bar 41 may be mounted a desired distance above the ground. The sleeve 40 is slidable along the bar 41 to adjusted positions transversely of the harrow in order that side draft during use of the harrow may be controlled and, in order to secure the sleeve in set position, there has been provided a large pin 46 passing vertically through a selected set of openings 47 formed in the bar and through slots 48 formed in upper and lower portions of the sleeves circumferentially thereof. When the pin 46 is passed through a selected set of openings 47 the sleeve will be held in a predetermined location upon the bar and since the sleeve is formed with the slots 47, the draft beam may be swung vertically to adjusted position within limits defined by the slots. Plates 49 extend upwardly from the sleeve at opposite sides of the upper slot 47 and are formed with a plurality of alined openings 50 to receive a bolt 51 which passes through the head at the upper end of the pin 46 and secures the sleeve against turning movement about the draft bar 41. Therefore, after the sleeve and draft beam 34 have been shifted to a desired position transversely of the harrow and secured in this position by the pin 46, the draft beam may be swung vertically to an adjusted angle and secured by the bolt 51.

In Figs. 8 through 12 of the drawings, there has been illustrated a harrow of modified construction. In this embodiment, the main frame includes in its construction, front and rear frames 52 and 53 for carrying disks and these frames are secured to bars 54 having their rear portions extending diagonally toward the left side of the harrow. The disk-carrying frames are spaced from each other longitudinally of the main frame and extend in converging relation to each other toward the left side of the machine. A control shaft 55 extends transversely of the main frame in space between the front and rear frames and this shaft is mounted for rocking movement through bearings 56. A second rock shaft or axle 57, which also extends transversely of the harrow, is spaced rearwardly from the shaft 55 and its left hand end portion passes through a bearing sleeve 58 and is mounted through the rear end of a drag link or bar 59 which extends longitudinally of the harrow and has its front end pivoted to a depending arm or bracket 60 carried by the front frame 52 at the front of the left end thereof. The bearing 58 carries an arm 61 extending forwardly and rigidly secured to the lower end of an upright link 62 which has its upper end pivoted to an arm 63 fixed to and extending rearwardly from the control shaft 55. Another arm 64 is fixed to the control shaft near the right end thereof and at its rear end is pivoted to the upper end of an upright 65 which has its lower end pivoted to an arm 66 fixed to and extending forwardly from the axle. By this arrangement, the axle will be turned as well as shifted vertically when the control shaft 55 is turned. An arm or bar 67 is fixed to the axle and extends forwardly therefrom and, together with the front end of a drag link 68, rotatably supported the right wheel 69 of the harrow. The rear end of the drag link 68 is pivoted to the lower end of a bracket 70 carried by the rear frame 53 and the right hand end of the axle is journaled through this drag link. By this arrangement, the axle may be turned in the bearing 58 and in the drag link 68 and, while the left hand wheel 71 will be swung vertically to adjusted positions with relation to the right wheel, the right wheel will have faster vertical adjustment, due to the fact that the arm 67 and the drag link 68 have swinging movement independent of the axle 57 and carry the right wheel with them. Turning of the control shaft may be accomplished from the hydraulic lift of a tractor by means of the chain 71 having its rear end secured to the lower end of the lever 72 carried by the control shaft and the control shaft may be manually turned by the screw 73 corresponding to the screw 26, having forks at its front end pivoted to the upper end of the lever 72. The rear end of the screw is threaded for engagement with the sleeve 74 corresponding to the sleeve 30 and, when the sleeve is turned by the crank handle 75, manual adjustment of the wheels will be accomplished. Brackets 76 corresponding to brackets 31 slidably mount the sleeve 74 so that adjustment of the wheels by the hydraulic lift will not be interfered with.

Having thus described the invention, what is claimed is:

1. In an agricultural machine of the character described, front and rear disk-carrying frames extending transversely of the machine in converging relation to each other toward one side of the machine, a draft bar carried by the front frame in front thereof substantially parallel to the front frame, a mounting shiftable along the draft bar to adjusted positions transversely of the machine, and a draft beam carried by and extending forwardly from the mounting, said mounting being adapted to be turned about the draft bar for vertical swinging adjustment of the draft beam.

2. In an agricultural machine of the character described, front and rear disk-carrying frames extending transversely of the machine in converging relation to each other toward one side of the machine, a draft bar carried by the front frame in front thereof substantially parallel to the front frame, a sleeve fitting about the draft bar and shiftable along the same to adjusted positions, a plate extending forwardly from the sleeve, a draft beam carried by said plate and extending forwardly therefrom, said sleeve being also adapted to be turned about the bar for swinging the beam to vertically adjusted positions, and means for releasably securing the sleeve in set positions upon the bar.

3. In an agricultural machine of the character described, front and rear disk-carrying frames extending transversely of the machine in converging relation to each other toward one side of the machine, a draft bar carried by the front frame in front thereof substantially parallel to the front frame, a sleeve fitting about the draft bar and shiftable along the same to adjusted positions, a plate extending forwardly from the sleeve, a draft beam carried by said plate and extending forwardly therefrom, said sleeve being also adapted to be turned about the bar for swinging the beam to vertically adjusted positions and formed with opposed circumferentially extending slots, a removable pin passing through said bar and through the slots to releasably secure the sleeve against displacement longitudinally of the bar and having end portions passing through slots of the sleeve, and means cooperating with the pin for releasably securing the sleeve against turning about the bar.

4. In an agricultural machine of the character described, front and rear disk-carrying frames extending transversely of the machine in converging relation to each other toward one side of the machine, a draft bar carried by the front frame in front thereof substantially parallel to the front frame, a sleeve fitting about the draft bar and shiftable along the same to adjusted positions, a plate extending forwardly from the sleeve, a draft beam carried by said plate and extending forwardly therefrom, said sleeve being also adapted to be turned about the bar for swinging the beam to vertically adjusted position and formed with opposed circumferentially extending slots, a removable pin passing through said bar and through the slots to releasably secure the sleeve against displacement longitudinally of the bar and having end portions passing through slots of the sleeve, plates carried by said sleeve at opposite sides of one slot and formed with openings spaced from each other circumferentially of the sleeve, and a fastener passing through selected openings of the plates and through one end of the pin to anchor the sleeve against turning about the bar and hold the draft beam at a vertically adjusted angle.

5. In an agricultural machine of the character described, a main frame, a disk-carrying frame carried by the main frame and extending diagonally across the same, a draft bar mounted across the disk-carrying frame, a mounting for a draft beam shiftable along the draft bar to adjusted position and about the draft bar to vertically adjusted angles, a fastener for securing the mounting in a set position along the bar, and a second fastener engaging the first mentioned fastener to secure same and hold the mounting in an angularly adjusted position.

6. In an agricultural implement, a main frame including longitudinally extending bars, front and rear disk-carrying frames carried by said bars and extending diagonally of the main frame in converging relation to each other toward one side of the implement, shafts extending transversely of the main frame between the front and rear frames and mounted for rocking adjustment, arms carried by said shafts and extending radially therefrom, wheels rotatably carried by the arms, one shaft being disposed forwardly of the other, levers carried by the shafts, a link connecting the levers with each other for simultaneous movement, a chain attached to the front lever and extending forwardly from the implement for connection with a hydraulic lift of a tractor, and manually operated actuating means connected with the rear lever.

7. In an agricultural implement, a main frame including longitudinally extending bars, front and rear disk-carrying frames carried by said bars and extending diagonally of the main frame in converging relation to each other toward one side of the implement, shafts extending transversely of the main frame between the front and rear frames and mounted for rocking adjustment, arms carried by said shafts and extending radially therefrom, wheels rotatably carried by the arms, one shaft being disposed forwardly of the other, levers carried by the shafts, a link connecting the levers with each other for simultaneous movement, a chain attached to the front lever and extending forwardly from the implement for connection with a hydraulic lift of a tractor, a sleeve carried by the rear frame, and a screw slidable through said sleeve and connected with the upper end of the rear lever for tilting the lever and shifting the wheels vertically when the screw is turned.

8. In an agricultural implement, front and rear disk carrying frames, means holding the frames in spaced relation but converging toward one side of the implement, a pair of shafts mounted for rotation between the frames, ground engaging wheels, means connecting the ground engaging wheels to the outer ends of their respective shafts so as to be raised and lowered thereby upon rotation of the shafts, arms mounted on the shafts by which the shafts may be rotated, means connecting the arms so as to cause the arms to rotate together, the arm on the shaft having its wheel disposed between the convergent ends of the frames being longer than the arm on the other shaft whereby, when the shafts are rotated, the wheel between the divergent ends of the frame will be moved more rapidly than the wheel at the convergent ends of the frames.

9. In an agricultural implement, front and rear disk carrying frames, means holding the frames in spaced relation but converging toward one side of the implement, a pair of shafts mounted for rotation between the frames, ground engaging wheels, means connecting the ground engaging wheels to the outer ends of their respective shafts so as to be raised and lowered thereby upon rotation of the shafts, arms mounted on the shafts by which the shafts may be rotated, means connecting the arms so as to cause the arms to rotate together, the arm on the shaft having its wheel disposed between the convergent ends of the frames being longer than the arm on the other shaft whereby, when the shafts are rotated, the wheel between the divergent ends of the frame will be moved more rapidly than the wheel at the convergent ends of the frame, and means operable from the forward end of the implement for rotating said arms.

10. In an agricultural implement, front and rear disk carrying frames, means holding the frames in spaced relation but converging toward one side of the implement, a pair of shafts mounted for rotation between the frames, ground engaging wheels, means connecting the ground engaging wheels to the outer ends of their respective shafts so as to be raised and lowered thereby upon rotation of the shafts, arms mounted on the shafts by which the shafts may be rotated, means connecting the arms so as to cause the arms to rotate together, the arm on the shaft having its wheel disposed between the convergent ends of the frames being longer than the arm on the other shaft whereby, when the shafts are rotated, the wheel between the divergent ends of the frame will be moved more rapidly than the wheel at the convergent ends of the frame, means operable from the forward end of the implement for rotating said arms, and means operable from the rear frame for rotating said arms.

CLARENCE E. NEWKIRK.